M. ORO.
SCREW DRIVER CHUCK FOR DRILL PRESSES.
APPLICATION FILED JAN. 3, 1921.

1,415,687.

Patented May 9, 1922.

Inventor:
Magnar Oro.
By his attorney,
Charles S. Gooding.

UNITED STATES PATENT OFFICE.

MAGNAR ORO, OF ROXBURY, MASSACHUSETTS.

SCREW-DRIVER CHUCK FOR DRILL PRESSES.

1,415,687.        Specification of Letters Patent.    Patented May 9, 1922.

Application filed January 3, 1921. Serial No. 434,688.

*To all whom it may concern:*

Be it known that I, MAGNAR ORO, a subject of Norway, residing at Roxbury, in the county of Suffolk and State of Massachusetts, have invented new and useful Improvements in Screw-Driver Chucks for Drill Presses, of which the following is a specification.

This invention relates to a screw driver chuck for a drill press.

The object of the invention is to provide a chuck by means of which a screw driver may be mounted upon the spindle of a drill press, the chuck being adapted to hold a screw driver with enough pressure to quickly and positively drive a screw into the work but after said screw has been fully set in position by the screw driver if the drill press spindle continues to rotate, the chuck will automatically slip, thereby preventing any injury to the head of the screw or to the screw driver.

The invention consists in the combination and arrangement of parts set forth in the following specification and particularly pointed out in the claims thereof.

Referring to the drawings.

Like numerals refer to like parts throughout the several views of the drawings.

Figure 1:
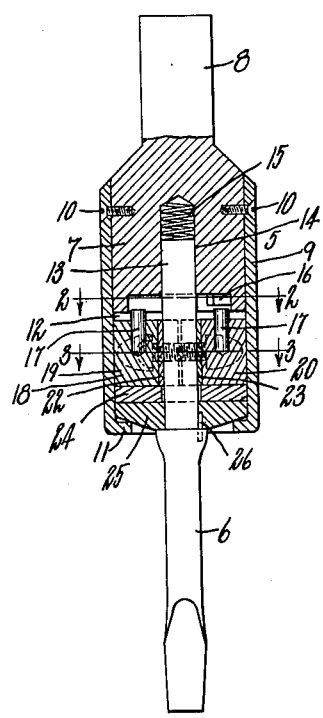
Figure 1 represents a longitudinal sectional elevation of a chuck embodying my invention.
Figure 2:
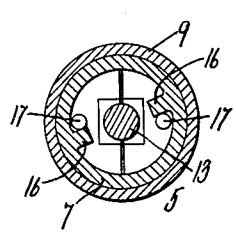
Fig. 2 is a transverse section taken on the line 2—2 of Fig. 1.
Figure 3:
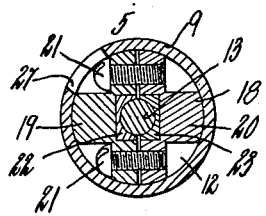
Fig. 3 is a transverse section taken on the line 3—3 of Fig. 1.

In the drawings, 5 is a chuck and 6 is a screw driver mounted thereon. The chuck 5 embodies therein a cylindrical body portion 7 and a shank 8 which fits the rotary spindle of a drill press to which it is fastened in any desirable manner. An exterior sleeve 9 is fastened to the cylindrical body portion 7 by means of screws 10. The exterior sleeve 9 extends below the lower end of the body portion 7 and has an inwardly projecting flange 11 formed at its lower end, thereby providing a chamber 12 in which the various gripping instrumentalities are located. The screw driver 6 has a shank 13 formed thereon which projects upwardly through the chamber 12 into a recess 14 provided in the body portion 7 of the chuck 5 and in this recess is located a spring 15 which bears against the upper end of the shank 13 of said screw driver.

The body portion 7 of the chuck 5 has projections 16 formed thereon which are adapted, as will be hereinafter described, to engage pins 17 on a split collar 18 located in the chamber 12. The split collar 18 is constructed in two parts 19 and 20, said parts being fastened together by means of screws 21. Between the parts 19 and 20 and encircling the shank 13 are two clamping jaws 22 and 23 which are preferably constructed of fibre or some other suitable friction material. A washer 24 also constructed of fibre surrounds the shank 13 being interposed between the split collar 18 and a metal collar 25 also surrounding the shank 13 and fastened to the screw driver 6 by a pin 26. The spring 15 normally tends to force the flange 11 at the lower end of the cylindrical sleeve 9 against the under surface of the collar 25 as illustrated in Figure 1. The sleeve 9 is also provided with an opening 27 through which the end of a screw driver may be inserted to engage the screws 21 for the purpose of adjusting the clamping jaws 22 and 23 through the medium of the split collar 18.

The general operation of the device is as follows:—The spindle of the drill press with the device mounted therein is lowered in the usual manner until the screw driver 6 engages the slot in the head of the screw which is to be driven. At this time the screw driver may be rotated by hand to align with the slot in the head of the screw because of the fact that the projections 16 are out of engagement with the pins 17 and the gripping instrumentalities will turn loosely within the chamber 12 with the screw driver. As soon as the drill press is thrown into gear to automatically feed the spindle downwardly, the shank 8 will be moved downwardly until the projections 16 engage the pin 17 whereupon the split collar 18 will be rotated thereby also rotating the clamping jaws 22 and 23 and the screw driver clamped therein. The shank 13 of the screw driver is held by the clamping jaws 22 and 23 with sufficient friction to drive the screw into the work until the head of said screw contacts with said work, whereupon the jaws 22 and 23 will slip upon said shank.

During the last part of the downward movement of the drill press spindle, chuck 5 and screw driver 6 the cylindrical portion 7 will be fed downwardly to overcome the tension of the spring 15 until the lower edge of said cylindrical portion abuts against the upper face of the split collar 18. This will press the fibre washer 24 against the metal collar 25 and the increased friction will cause a final hard turn to be given to the screw driver, which will, in turn, be transmitted to the screw. After the screw is firmly set in the work, the screw driver 6 may still remain in the slot in the head of the screw, but will automatically cease to rotate. The clamping jaws 22 and 23, however, will continue to rotate with the shank 8 and cylindrical body portion 7, the clamping jaws slipping upon the shank 13 of the screw driver, and this slipping action will continue until the projections 16 are disengaged from the pins. When the drill press spindle is retracted, the various portions of the chuck and screw driver will be drawn upwardly and said parts will assume the relative positions as illustrated in Figure 1.

The pressure applied to the clamping jaws 22 and 23 by the parts 19 and 20 of the split collar 18 may be varied if desired by inserting a screw driver through the opening 27 and turning the screws 21 in the proper direction.

It is evident that in place of the screw driver 6 other forms of tools may be utilized with the chuck as, for example, a socket wrench adapted to engage a nut or bolt to rotate the same and such device would fall within the scope of the appended claims.

I claim:

1. A chuck having, in combination, a rotatable body portion adapted to receive a tool, a sleeve attached to said body portion and co-operating therewith to form a chamber, a pair of clamping jaws located within said chamber normally disconnected from said body portion and free to rotate independently thereof and frictionally engaging said tool and means to rotate said jaws in unison with said body portion and thereby rotate said tool.

2. A chuck having, in combination, a rotatable body portion adapted to receive a tool, a sleeve attached to said body portion and co-operating therewith to form a chamber, a pair of clamping jaws located within said chamber and normally disconnected from said body portion and free to rotate independently thereof, means to force said jaws into frictional engagement with said tool and means to rotate said jaws in unison with said body portion and thereby rotate said tool.

3. A chuck having, in combination, a rotatable body portion adapted to receive a tool, a sleeve attached to said body portion and co-operating therewith to form a chamber, a split collar loosely mounted within said chamber and normally free to rotate independently of said body portion, a pair of clamping jaws located within said split collar and frictionally engaging said tool and means to positively rotate said split collar in unison with said body portion and thereby rotate said tool.

4. A chuck having, in combination, a rotatable body portion adapted to receive a tool, a sleeve attached to said body portion and co-operating therewith to form a chamber, a split collar loosely mounted within said chamber, a pair of clamping jaws located within said split collar and frictionally engaging said tool, a second collar fast to said tool, a friction washer interposed between said collars and means to rotate said split collar in unison with said body portion and thereby rotate said tool.

5. A chuck having, in combination, a rotatable body portion adapted to receive a tool, a sleeve attached to said body portion and co-operating therewith to form a chamber, a split collar loosely mounted within said chamber and normally free to rotate independently of said body portion, a pair of clamping jaws located within said split collar and frictionally engaging said tool, means to normally hold said body portion out of engagement with said split collar, means to rotate said split collar in unison with said body portion and thereby rotate said tool and auxiliary means for assisting in the rotation of said tool.

6. A chuck having, in combination, a rotatable body portion adapted to receive a tool, a sleeve attached to said body portion and co-operating therewith to form a chamber, a split collar loosely mounted within said chamber and normally free to rotate independently of said body portion, and embodying therein a plurality of members, a pair of clamping jaws located between said members, means to clamp said members together and thereby force said clamping jaws into frictional engagement with said tool, means to rotate said split collar in unison with said body portion and thereby rotate said tool and auxiliary friction means for assisting in the rotation of said tool.

7. A chuck having, in combination, a rotatable body portion adapted to receive a tool and provided with projections thereon, a sleeve attached to said body portion and co-operating therewith to form a chamber, a split collar loosely mounted within said chamber and normally free to rotate independently of said body portion, pins projecting from said split collar, a pair of clamping jaws detachably mounted within said split collar adapted to rotate therewith and frictionally engaging said tool, means to hold said body portion out of engagement with said split collar, said split collar being rotated by said body portion when said projections are forced into engagement with said pins and thereby rotating said tool and auxiliary friction means adapted to be engaged by said split collar to assist in the rotation of said tool.

8. A chuck having, in combination, a rotatable body portion adapted to receive a tool and provided with projections thereon, a sleeve attached to said body portion and co-operating therewith to form a chamber, a split collar loosely mounted within said chamber and normally free to rotate independently of said body portion, pins projecting from said split collar, a pair of clamping jaws located within said split collar and adapted to rotate therewith, means to fasten the members of said split collar together and thereby clamp said clamping jaws to said tool, a spring interposed between said body portion and said tool adapted to normally hold said body portion out of engagement with said split collar, said split collar being rotated by said body portion when said projections are forced into engagement with said pins and thereby rotating said tool and auxiliary friction means co-operating with said split collar for assisting in the rotation of said tool.

9. A chuck having, in combination, a rotatable body portion adapted to receive a tool and provided with projections thereon, a sleeve attached to said body portion and co-operating therewith to form a chamber, a split collar loosely mounted within said chamber and embodying therein a plurality of members, pins projecting from said split collar, a pair of clamping jaws located between said members adapted to rotate therewith and frictionally engage said tool, a spring interposed between said body portion and said tool adapted to normally hold said body portion out of engagement with said split collar, a second collar fast to said tool and a friction washer interposed between said collars and having frictional engagement with each, said split collar being rotated by said body portion when said projections are forced into engagement with said pins and thereby rotating said tool.

In testimony whereof I have hereunto set my hand in presence of two subscribing witnesses.

MAGNAR ORO.

Witnesses:
FRANKLIN E. LOW,
HAZEL F. LA MUDGE.